Oct. 26, 1948.　　　A. Z. THOMPSON　　　2,452,338
LOGGING CART

Filed Feb. 14, 1947　　　4 Sheets-Sheet 1

Inventor
Alonzo Z. Thompson

By　*Clarence A. O'Brien
and Harvey B. Jacobson*
Attorneys

Oct. 26, 1948.  A. Z. THOMPSON  2,452,338
LOGGING CART
Filed Feb. 14, 1947  4 Sheets-Sheet 3
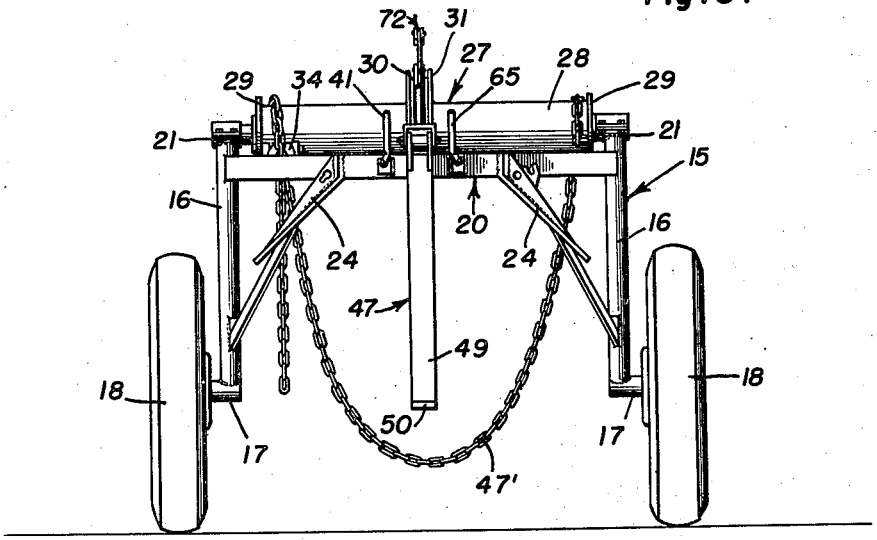
Fig. 3.
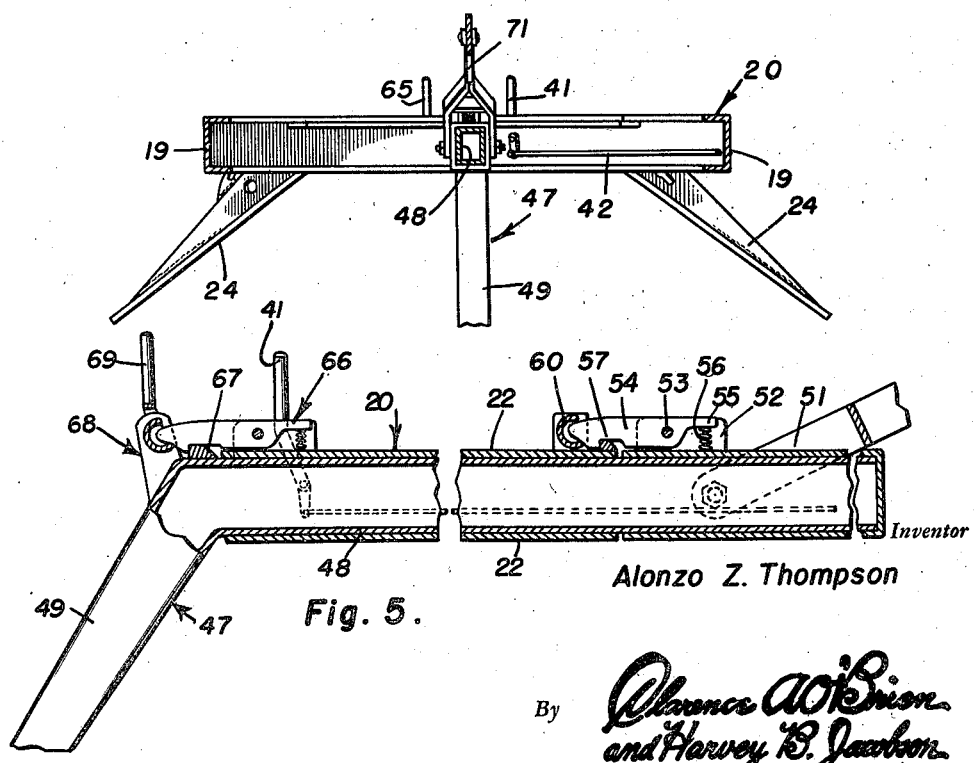
Fig. 4.
Fig. 5.
Inventor
Alonzo Z. Thompson

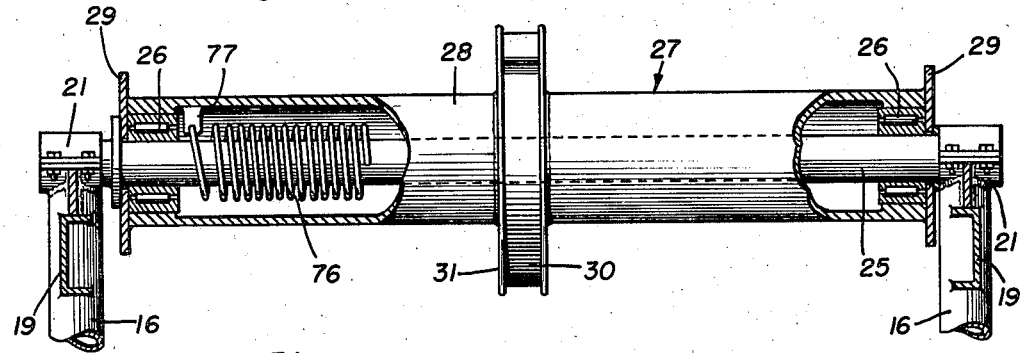
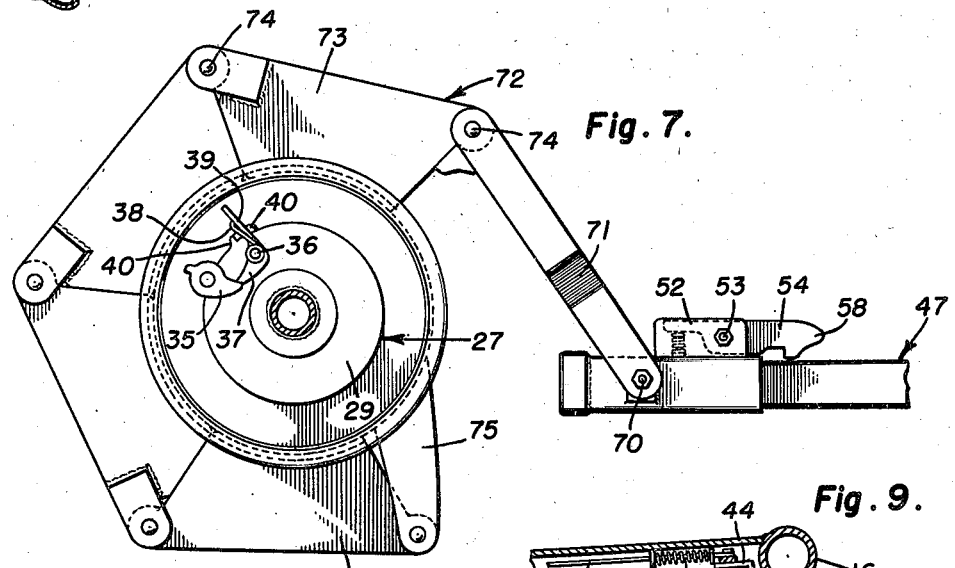
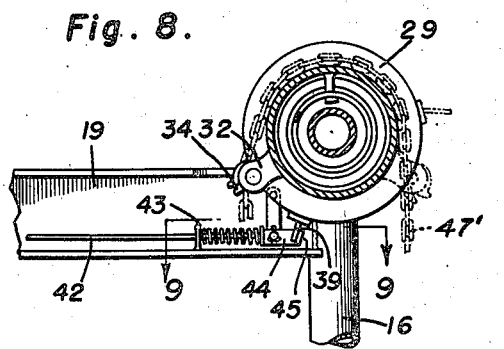
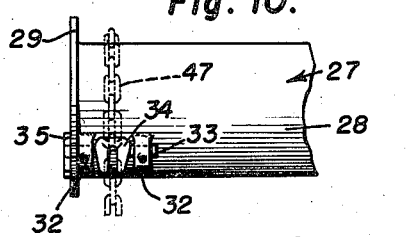

Patented Oct. 26, 1948

2,452,338

UNITED STATES PATENT OFFICE 2,452,338

LOGGING CART

Alonzo Z. Thompson, Selma, N. C.

Application February 14, 1947, Serial No. 728,453

8 Claims. (Cl. 214—65.3)

This invention relates to a logging cart and has for its primary object automatically to elevate a log from contact with the ground as pull is exerted on the draft tongue of the cart to move it.

Another object is to facilitate the discharge of the log from the cart after it has been moved to a desired position.

A still further object is to hold the draft tongue against movement relative to the cart when it is desired to move the cart from place to place without its log load.

The above and other objects may be attained by employing this invention which embodies among its features an arched axle, supporting wheels on opposite ends of the axle, a main tongue extending forwardly from the axle, a draft tongue mounted in the main tongue to move along an axis which lies perpendicular to the axle, a drum mounted to rotate on the axle about an axis which lies perpendicular to the direction of movement of the draft tongue, a logging chain attached at opposite ends to the drum and means extending between the draft tongue and drum to rotate the drum and wind the logging chain thereon when the draft tongue is extended under the influence of pull exerted thereon.

Other features include means to latch the draft tongue in its forward or extended position, and also to latch it in its retracted position to facilitate easy transportation of the cart from place to place.

Still other features include a yoke pivotally supported on the drum adjacent one end releasably to hold one end of the logging chain in operative position with relation to the drum and means remote from the yoke and near the forward end of the main tongue to release the yoke and permit it to move into chain discharging position.

Still other features include a spring housed within the drum for exerting yielding pull against the draft tongue to return the parts to initial position after the load of logs has been discharged.

In the drawings:

Figure 3 is a front end view of Figure 1;

Figure 4 is a transverse sectional view taken substantially on the line 4—4 of Figure 2;

Figure 5 is a fragmentary enlarged longitudinal sectional view taken substantially along the line 5—5 of Figure 2;

Figure 6 is an enlarged sectional view taken substantially along the line 6—6 of Figure 1;

Figure 7 is a fragmentary enlarged sectional view taken substantially along the line 7—7 of Figure 2;

Figure 8 is a fragmentary sectional view taken substantially along the line 8—8 of Figure 2;

Figure 9 is a fragmentary sectional view taken substantially along the line 9—9 of Figure 8;

Figure 10 is a fragmentary enlarged view in elevation of the drum, showing in detail the releasable chain anchoring yoke;

Figure 11 is a fragmentary enlarged sectional view taken substantially along the line 11—11 of Figure 2;

Figure 12 is a transverse sectional view taken substantially along the line 12—12 of Figure 11; and Figure 13 is an enlarged perspective view of one of the drum actuating chain links.

Figure 1:
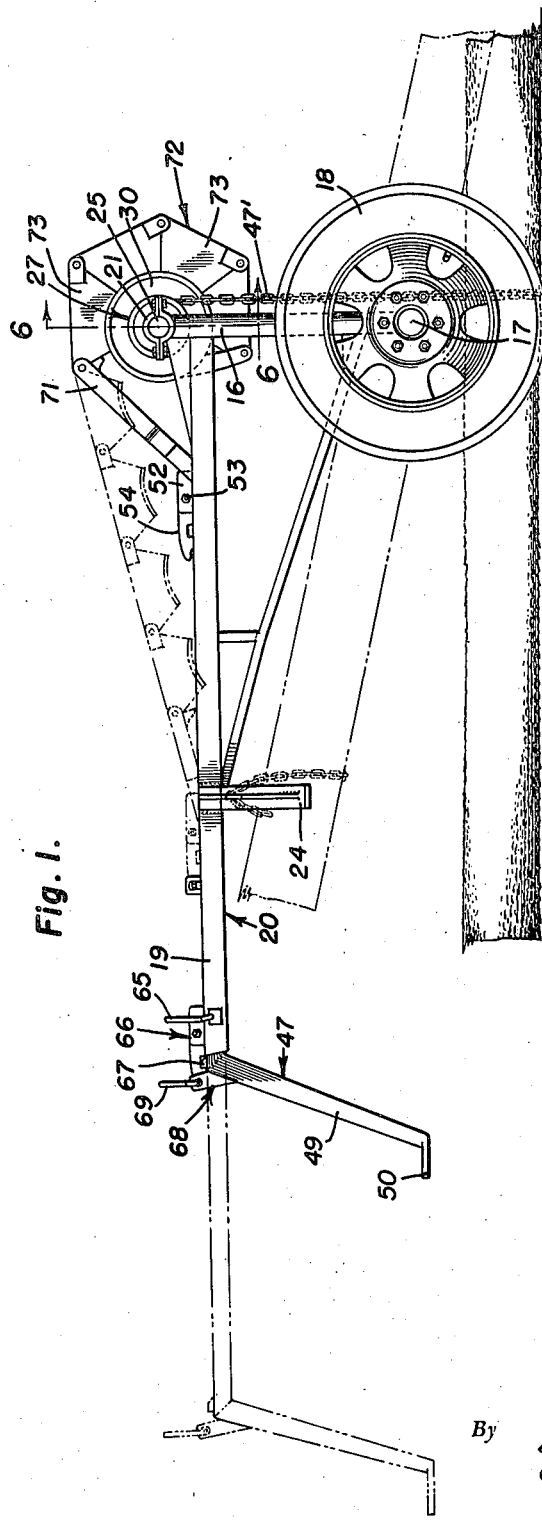
Figure 1 is a side view of the logging cart embodying the features of this invention.

Referring to the drawings in detail, this invention embodies an arched axle designated generally 15 comprising a pair of spaced parallel vertically extending legs 16 provided adjacent their lower ends with outwardly extending spindles 17 on which ground wheels 18 are mounted. These legs 16 have welded or attached adjacent their upper ends a pair of forwardly extending convergent side bars 19 which cooperate to form a forwardly extending main tongue designated generally 20. The upper ends of the standards 16 are equipped with bearing caps 21 the purpose of which will more fully hereinafter appear. Extending between the forward convergent ends of the side bars 19 adjacent the upper and lower edges thereof are triangular plates 22 forming guide webs which extend toward the axle 15 for a short distance, forming top and bottom guides for a draft tongue to be more fully hereinafter described. Suitable bracing gussets 23 extend between the innermost edges of the plates 22 and the inner faces of the convergent arms 19 as will be readily understood upon reference to Figure 2. Extending downwardly and outwardly from each side bar 19 are arms 24 which serve as stops against which the upper portions of the logs loaded into the cart bear as will be readily understood by reference to Figure 1.

Clamped in the journal caps 21 is a transversely extending shaft 25 which forms the upper member of the arched axle 15, and carried adjacent each end of the shaft 25 is an anti-friction bearing 26 upon which are rotatably supported opposite ends of a winding drum designated generally 27. This winding drum 27 comprises a tubular body 28 provided at each end with an annular flange 29 and as illustrated in Figure 6 the tubular body 28 is mounted at each end on the outer race of one of the anti-friction bearings 26. Carried on the drum 27 intermediate its ends is a drive pulley 30 which is of somewhat larger diameter than the diameter of the drum 27 and is provided adjacent opposite side edges with annular flanges 31 forming a channel in the periphery of the pulley in which the drum winding chain to be more fully hereinafter described is received. Pivotally supported in a pair of radially extending ears 32 adjacent one end of the drum 27 is a shaft 33 to which is attached in any suitable manner between the ears a U-shaped yoke 34 forming anchoring means for one end of the logging chain to be more fully hereinafter described. The shaft 33 extends slightly beyond the end of the drum 27 and secured thereto for turning movement therewith is a cam 35. Pivotally supported at 36 in spaced parallel relation to the cam 35 on the end of the drum 27 is a latch finger 37 which is normally urged into engagement with the cam 35 through the medium of a spring 38 which is coiled about the pivot 36 and provided with oppositely extending arms one of which bears against a latch actuating lever 39, while the opposite end is anchored to an adjacent flange 29 in such a manner to cause the latch 37 to return to a position to engage the cam 35, once it has been moved away from such position. Suitable stops 40 are carried by the adjacent end flange 29 to limit swinging movement of the lever arm 39 about the pivot 36 as will be readily understood upon reference to Figure 7. As illustrated, the lever arm 39 extends outwardly from the periphery of the flange 29 in substantially radial relation thereto and is adapted to be engaged by a release mechanism to be more fully hereinafter described. Pivotally mounted to the outer side of one of the side bars 19 of the tongue 20 is a hand lever 41 to which is coupled a suitable link 42 which lies parallel with the adjacent side bar 19 between the upper and lower flanges thereof and the rear end of this link is slidably mounted in a suitable bracket 43 (Figure 9) which serves as a guide for the link. Attached to the extreme rear end of the link is an angle bracket 44 having an inturned ear 45 which as illustrated in Figure 9 is adapted to engage behind the finger 39 so that when pull is exerted on the link 42 the finger 39 will be moved into latch releasing position. A suitable compression coil spring 46 surrounds the link 42 between the bracket 43 and the end bracket 44 yieldingly to hold the arm 45 against finger actuating movement. The end of the drum 27 opposite that carrying the yoke 34 is provided with a suitable chain anchor 46 to which one end of a logging chain 47' is attached. The opposite end of the logging chain is adapted to be entered into the slot in the yoke 34, so that when the drum 27 is rotated both ends of the chain 47' will be wrapped around the drum.

Mounted for longitudinal sliding movement in the forward end of the main tongue 20 is a draft tongue designated generally 47. This draft tongue comprises a hollow tubular body of rectangular cross section 48 provided at its forward end with a downturned extension 49 carrying at its extreme lower end a forwardly projecting coupling member 50 to which a traction vehicle is adapted to be connected. The opposite end of the draft tongue 47 has welded or otherwise rigidly fixed to its upper surface a stop plate 51 from which rise a pair of spaced parallel longitudinally extending ears 52 between which is pivotally supported as at 53 a latch 54. This latch is provided with a tail portion 55 which is engaged by one end of a coil spring 56, the opposite end of which is seated on the plate 51 so as to urge the nose end of the latch downwardly toward the draft tongue 47. A keeper 57 is welded or otherwise attached to the plate 22 adjacent the rear end thereof and is adapted to be engaged by the nose end of the latch 54 in order to hold the draft tongue in projected position. The latch 54 is provided with a forward projection 58 to be engaged by the release mechanism to be more fully hereinafter described.

Welded or otherwise detached to the plate 22 slightly behind the keeper 57 is a pair of spaced parallel upwardly extending ears 59 between which is rotatably supported a drum 60 on suitable trunnions 61, one of which projects beyond the adjacent ear 59 and has fixed thereto a radially extending lever 62. The drum 60 is provided with a relatively wide longitudinal slot 63 in which the projection 58 of the latch 54 is adapted to be received as will be readily understood upon reference to Figures 5 and 11. Coupled to the end of the lever 62 opposite that connected to the trunnions 61 is a pull rod 64 which extends forwardly between the upper and lower plates 22 to a hand lever 65 which is pivotally mounted on the main tongue 20 adjacent its forward end. It will thus be seen that by swinging the hand lever 65 about its pivot pull may be exerted on the pull rod 64 to cause the lever 62 to rotate the drum 60 in a direction to release the latch 54 from engagement behind the keeper 57. A similar latching mechanism designated generally 66 is supported adjacent the forward end of the plate 20 for engagement with a keeper 67 carried by the draft tongue 47 at the junction of the downturned extension 49 with the main body 48. A release mechanism designated generally 68 is carried by the draft tongue adjacent the keeper 67 and corresponds to the latch release mechanism previously described whereby the latch 66 may be released when it is desired to move the draft tongue 47 forwardly with relation to the main tongue. This release mechanism is actuated by a lever 69 as will be readily understood upon reference to Figure 5.

Pivotally coupled as at 70 (Figure 7) to the draft tongue 47 adjacent its rear end is the advance link 71 of a drum rotating chain designated generally 72. This chain 72 is composed of a plurality of links 73 comprising substantially sectorial plates pivotally joined together as at 74 and to the endmost link 71 previously referred to. The link 73 at the end of the chain opposite the link 71 is pivotally connected to an arm 75 which extends outwardly from the pulley wheel 30 and forms in effect a lengthening link for the chain. Each of the sectorial plates 73 is provided with an arcuate shoe 76 which is adapted to engage the pulley 30 between the flanges 31 in order to hold the chain links perpendicular to the surface of the pulley 30. The segmental shaped links 73 are resorted to so as to hold the diameter of the pulley 30 to a minimum and yet obtain the desired length of chain. It is obvious that an increased diameter of pulley 30 could be employed but in so doing interference with the elevation of the logs might result, and hence in order to provide the greatest clearance between the ground and the underside of the arched axle 15 I find it desirable to construct the chain as above described.

Figure 2:
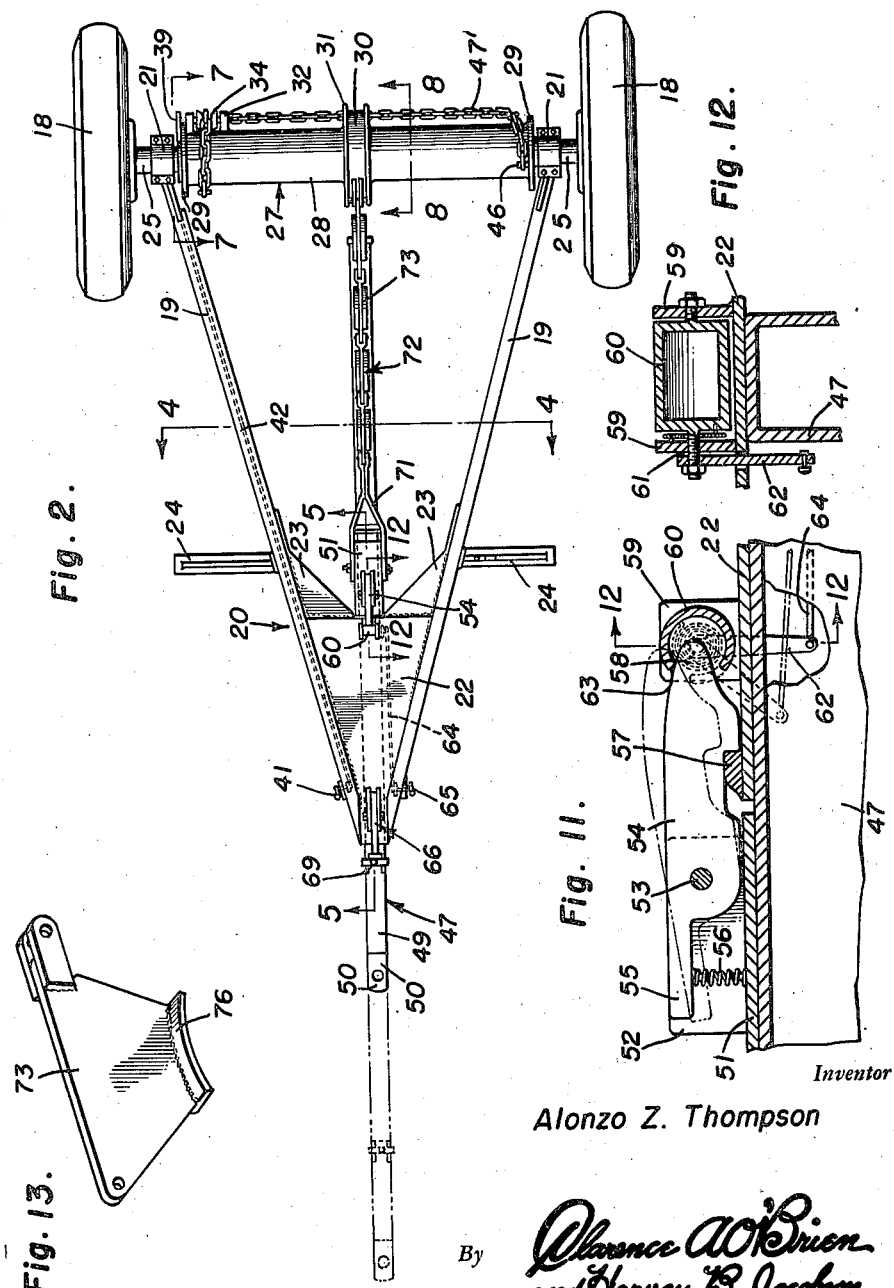
Figure 2 is a top plan view of Figure 1.

In use it will be understood that the logging cart is backed into position over a log or a group of logs to be lifted, whereupon the loose end of the chain 47' is passed beneath the log or logs as indicated in Figure 1. The forward end of the draft tongue 47 is coupled to a suitable traction vehicle and upon releasing the latch 66 by manipulation of the lever 69 and exerting pull on the draft tongue it will be evident that the chain, having first been coupled to the yoke 34 will be wound upon the drum 27 at both ends, thus lifting the log into the broken line position illustrated in Figure 1 through the unreeling of the chain 72 from the pulley 30. Upon reaching its extended position the draft tongue 47 is latched by the engagement of the latch 54 over the keeper 57 so that the drum will be held against rotation under the influence of the load of the logs. When the logs have been transported to their destination the lever 41 is manipulated to exert pull on the angle member 44 and thus move the finger 39 so as to lift the cam 37 out of contact with the cam 35 and permit the yoke 34 to move into a position which will allow the end of the chain to slip out of the yoke, thus dropping the load. With the load thus disposed of, the parts may be returned to their initial position by manipulating the lever 65 to release the latch 54 whereupon the drum 27 will be rotated under the influence of a spring 76 (Figure 6), one end of which is anchored to the shaft 25 while the opposite end is anchored to an ear 77 projecting inwardly toward the axis of the drum. Upon reaching its innermost length of travel the keeper 67 on the end of the tongue 47 engages the latch 66 and latches the tongue in retracted position ready for a repeat operation.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

1. A logging cart which includes an arched axle, supporting wheels at opposite ends of the axle, a main tongue extending forwardly from the axle, a draft tongue mounted in the main tongue to move along an axis which lies perpendicular to the axle, a drum mounted to rotate on the axle about an axis which lies perpendicular to the direction of movement of the draft tongue, a logging chain attached at opposite ends to the drum, means extending between the draft tongue and the drum to rotate the drum and wind the logging chain thereon when the draft tongue is extended under the influence of pull exerted thereon, a latch adjacent the forward end of the main tongue releasably to hold the draft tongue against movement when pull is exerted thereon and a latch adjacent the rear end of the draft tongue releasably to hold it extended.

2. A logging cart which includes an arched axle, supporting wheels at opposite ends of the axle, a main tongue extending forwardly from the axle, a draft tongue mounted in the main tongue to move along an axis which lies perpendicular to the axle, a drum mounted to rotate on the axle about an axis which lies perpendicular to the direction of movement of the draft tongue, a logging chain attached at opposite ends to the drum, means extending between the draft tongue and the drum to rotate the drum and wind the logging chain thereon when the draft tongue is extended under the influence of pull exerted thereon and a spring within the drum to return the draft tongue to retracted position.

3. A logging cart which includes an arched axle, supporting wheels at opposite ends of the axle, a main tongue extending forwardly from the axle, a draft tongue mounted in the main tongue to move along an axis which lies perpendicular to the axle, a drum mounted to rotate on the axle about an axis which lies perpendicular to the direction of movement of the draft tongue, a logging chain attached at opposite ends to the drum, means extending between the draft tongue and the drum to rotate the drum and wind the logging chain thereon when the draft tongue is extended under the influence of pull exerted thereon, a spring within the drum to return the draft tongue to retracted position, and a latch adjacent the rear end of the draft tongue releasably to hold it against retraction under the influence of the spring in the drum.

4. A logging cart which includes an arched axle, supporting wheels at opposite ends of the axle, a main tongue extending forwardly from the axle, a draft tongue mounted in the main tongue to move along an axis which lies perpendicular to the axle, a drum mounted to rotate on the axle about an axis which lies perpendicular to the direction of movement of the draft tongue, a logging chain fixed at one end adjacent one end of the drum, means detachably coupling the opposite end of the chain to the drum near its opposite end, means extending between the draft tongue and the drum to rotate the drum and wind the logging chain thereon when pull is exerted on the draft tongue and manually actuated means adjacent the forward end of the main tongue to release the chain from the coupling means.

5. A logging cart which includes an arched axle, supporting wheels at opposite ends of the axle, a main tongue extending forwardly from the axle, a draft tongue mounted in the main tongue to move along an axis which lies perpendicular to the axle, a drum mounted to rotate on the axle about an axis which lies perpendicular to the direction of movement of the draft tongue, a logging chain attached at opposite ends to the drum and flexible means fixed at one end to the drum and at its opposite end to the draft tongue to cause the drum to rotate and wind the logging chain thereon when the draft tongue is extended under the influence of pull exerted thereon.

6. A logging cart which includes an arched axle, supporting wheels at opposite ends of the axle, a main tongue extending forwardly from the axle, a draft tongue mounted in the main tongue to move along an axis which lies perpendicular to the axle, a drum mounted to rotate on the axle about an axis which lies perpendicular to the direction of movement of the draft tongue, a logging chain attached at opposite ends to the drum, flexible means fixed at one end to the drum and at its opposite end to the draft tongue to cause the drum to rotate and wind the logging chain thereon when the draft tongue is extended under the influence of pull exerted thereon and a spring within the drum to return the draft tongue to retracted position.

7. A logging cart which includes an arched axle, supporting wheels at opposite ends of the axle, a main tongue extending forwardly from the axle, a draft tongue mounted in the main tongue to move along an axis which lies perpendicular to the axle, a drum mounted to rotate on the axle about an axis which lies perpendicular to the direction of movement of the draft tongue, a logging chain fixed at one end adjacent one end of the drum, a yoke pivotally supported on the drum adjacent its opposite end and means releasably to hold the yoke in a position to couple the opposite end of the chain to the drum.

8. A logging cart which includes an arched axle, supporting wheels at opposite ends of the axle, a main tongue extending forwardly from the axle, a draft tongue mounted in the main tongue to move along an axis which lies perpendicular to the axle, a drum mounted to rotate on the axle about an axis which lies perpendicular to the direction of movement of the draft tongue, a logging chain fixed at one end adjacent one end of the drum, a yoke pivotally supported on the drum adjacent its opposite end, means releasably to hold the yoke in a position to couple the opposite end of the chain to the drum and manually actuated means adjacent the forward end of the main tongue to release the yoke holding means and allow it to move into chain discharging position under the influence of the weight of the logging chain.

ALONZO Z. THOMPSON.

REFERENCES CITED

The following references are of record in the file of this patent:

UNITED STATES PATENTS

| Number | Name | Date |
| --- | --- | --- |
| 1,182,275 | Hutson et al. | May 9, 1916 |
| 2,261,509 | Williams | Nov. 4, 1941 |
| 2,317,784 | Lewis | Apr. 27, 1943 |
| 2,361,181 | Dowd | Oct. 24, 1944 |
| 2,399,304 | Watkins | Apr. 30, 1946 |
| 2,407,993 | McKee | Sept. 24, 1946 |
| 2,412,412 | Meili | Dec. 10, 1946 |
| 2,433,822 | Bartholomew | Dec. 30, 1947 |